UNITED STATES PATENT OFFICE.

PETER J. GELLER, OF DETROIT, MICHIGAN.

PAINT AND VARNISH REMOVER.

951,369.

Specification of Letters Patent. Patented Mar. 8, 1910.

No Drawing. Application filed September 21, 1907. Serial No. 393,944.

*To all whom it may concern:*

Be it known that I, PETER J. GELLER, a citizen of the United States of America, residing at Detroit, in the county of Wayne and State of Michigan, have invented certain new and useful Improvements in Paint and Varnish Removers, of which the following is a specification.

The invention relates to a compound for removing paint and varnish, consisting primarily of a softening agent adapted to readily penetrate and loosen the coat to be removed, a wax for retarding its evaporation, and a suspensory fluid for preventing precipitation of the wax.

Paint removing compounds have heretofore been produced including ingredients for the softening of the paint or varnish and the prevention of too rapid evaporation of the compound, permitting its use on vertical as well as horizontal surfaces. In these compounds, however, when allowed to stand for any considerable period of time the wax precipitates, collecting in the bottom of the can or container in which the article is sold in a gelatinous mass, necessitating a reformation of the mixture, which is extremely difficult to obtain even by thorough stirring.

It is the primary object of the present invention to produce a remover compound having, in addition to the usual softening and retarding agents, an ingredient for holding the wax permanently in suspension, thus eliminating the objectionable features above referred to.

For the formation of the compound, I employ as the retarding agent a wax or waxy body. This is combined with any penetrating agent, as alcohol, and with a hydrocarbon oil,—as benzol, which acts to soften the coat to be removed. In the resulting mixture the wax is held temporarily in suspension, and to prevent its precipitation I add a suspensory fluid that will serve to permanently maintain the wax in suspension. Preferably I employ as the suspensory agent anilin oil, which emulsifies the wax and forms a permanent mixture.

In combining the parts I use preferably two ounces of wax, one ounce each of cerasin and paraffin, and dissolve the waxy body preferably by steam heat. To the wax are added preferably five pints of benzol, three pints of wood alcohol, and after the several ingredients have been thoroughly mixed I further add about one ounce of anilin oil, which is intimately mixed with the other ingredients, acting as previously set forth to emulsify the wax and prevent its precipitation.

While I have set forth the preferred proportion for the ingredients, the preferable steps in forming the mixture, and the preferable suspensory fluid, I do not desire to be limited thereto as it will be obvious that the amounts of the ingredients may be varied, the manner of combining changed, and any medium employed that will have the characteristics of the anilin oil in supporting the wax and preventing its precipitation after the formation of the mixture.

What I claim as my invention is,—

1. A paint and varnish remover, consisting of a waxy body, a softening and penetrating agent consisting of a hydrocarbon oil and an alcohol, and a suspensory fluid for the wax consisting of anilin oil.

2. A paint and varnish remover, consisting of an emulsion of wax, hydrocarbon and anilin oils, and an alcohol.

3. A paint and varnish remover, consisting of a waxy body formed of cerasin and paraffin waxes, benzol, alcohol, and an anilin oil, in substantially the proportions specified.

In testimony whereof I affix my signature in presence of two witnesses.

PETER J. GELLER.

Witnesses:
NELLIE KINSELLA,
JAMES P. BARRY.